US010619666B2

(12) United States Patent
Müntener et al.

(10) Patent No.: US 10,619,666 B2
(45) Date of Patent: Apr. 14, 2020

(54) STEERING SHAFT FOR A MOTOR VEHICLE

(71) Applicants: ThyssenKrupp Presta AG, Eschen (LI); thyssenkrupp AG, Essen (DE)

(72) Inventors: Herbert Müntener, Ruggell (LI); Werner Gstach, Frastanz (AT)

(73) Assignee: thyssenkrupp AG, Essen (DE)

( * ) Notice: Subject to any disclaimer, the term of this patent is extended or adjusted under 35 U.S.C. 154(b) by 305 days.

(21) Appl. No.: 15/531,002

(22) PCT Filed: Sep. 22, 2015

(86) PCT No.: PCT/EP2015/071732
§ 371 (c)(1),
(2) Date: Aug. 31, 2017

(87) PCT Pub. No.: WO2016/082970
PCT Pub. Date: Jun. 2, 2016

(65) Prior Publication Data
US 2017/0356487 A1    Dec. 14, 2017

(30) Foreign Application Priority Data
Nov. 28, 2014    (DE) .................. 10 2014 017 555

(51) Int. Cl.
*F16C 3/03*    (2006.01)
*F16C 3/035*    (2006.01)
(Continued)

(52) U.S. Cl.
CPC ............... *F16C 3/035* (2013.01); *B62D 1/16* (2013.01); *B62D 1/20* (2013.01); *F16C 29/04* (2013.01);
(Continued)

(58) Field of Classification Search
CPC ...... F16C 3/035; F16C 29/04; F16C 2326/24; F16D 3/065; B62D 1/16; B62D 1/20; B62D 1/185
(Continued)

(56) References Cited

U.S. PATENT DOCUMENTS 754,066 A * 3/1904 Hoffmann ............ 464/167
4,504,245 A * 3/1985 Orain .............. B60K 17/30
464/167
(Continued)

FOREIGN PATENT DOCUMENTS

CN    201494492 U    6/2010
CN    102180191 A    9/2011
(Continued)

OTHER PUBLICATIONS

International Search Report for International Application No. PCT/EP2015/071732 dated Jan. 11, 2016, 3 pages.

*Primary Examiner* — Greg Binda
(74) *Attorney, Agent, or Firm* — RMCK Law Group PLC

(57) ABSTRACT

A steering shaft for a motor vehicle, comprises an outer shaft which is configured as a hollow shaft and an inner shaft which is arranged coaxially in the hollow shaft. The inner shaft can be telescoped relative to the hollow shaft in the direction of the longitudinal axis of the steering shaft, and is connected to the hollow shaft in a torque-transmitting manner via at least one positively locking element. A securing apparatus with at least one stop element is attached on an end region of the hollow shaft which faces the inner shaft. A stop face is arranged in the opening cross section of the hollow shaft and faces the hollow shaft in the direction of the longitudinal axis.

11 Claims, 3 Drawing Sheets

(51) Int. Cl.
*B62D 1/20* (2006.01)
*B62D 1/16* (2006.01)
*F16C 29/04* (2006.01)
*F16D 3/06* (2006.01)
*B62D 1/185* (2006.01)

(52) U.S. Cl.
CPC .............. *F16D 3/065* (2013.01); *B62D 1/185* (2013.01); *F16C 2326/24* (2013.01)

(58) Field of Classification Search
USPC .............................. 464/167; 384/16; 280/775
See application file for complete search history.

(56) References Cited

U.S. PATENT DOCUMENTS

| | | |
|---|---|---|
| 5,722,300 A | 3/1998 | Burkhard et al. |
| 6,135,638 A * | 10/2000 | Agari ................. F16C 29/0688 384/16 |
| 10,309,463 B2 * | 6/2019 | Kinsella ................ F16D 3/2055 |
| 2005/0194775 A1 | 9/2005 | Bastein et al. |

FOREIGN PATENT DOCUMENTS

| | | |
|---|---|---|
| CN | 203345009 U | 12/2013 |
| DE | 3730393 A1 | 3/1989 |
| DE | 19648998 A1 | 6/1997 |
| DE | 102004009188 A1 | 9/2005 |
| DE | 102009000432 A1 | 7/2010 |
| EP | 1754646 B1 | 4/2013 |
| JP | 2007016901 A | 1/2007 |
| JP | 2007024122 A | 2/2007 |
| JP | 2008221905 A | 9/2008 |
| JP | 2010053943 A | 3/2010 |
| JP | 2012051384 A | 3/2012 |
| SE | 47419 * | 7/1920 .................... 464/167 |

* cited by examiner

STEERING SHAFT FOR A MOTOR VEHICLE

CROSS-REFERENCE TO RELATED APPLICATIONS

This application is a 371 U.S. National Stage of International Application No. PCT/EP2015/071732, filed Sep. 22, 2015, which claims priority to German Application No. 10 2014 017 555.3 filed on Nov. 28, 2014. The disclosure of each of the above applications is incorporated herein by reference in their entirety.

FIELD

The present disclosure relates to a steering shaft for a motor vehicle, comprising an outer shaft which is configured as a hollow shaft and an inner shaft which is arranged coaxially in the hollow shaft. The inner shaft can be telescoped relative to the hollow shaft in the direction of the longitudinal axis of the steering shaft, and is connected to the hollow shaft in a torque-transmitting manner via at least one positively locking element. A securing apparatus with at least one stop element is attached on an end region of the hollow shaft which faces the inner shaft. A stop face is arranged in the opening cross section of the hollow shaft and faces the hollow shaft in the direction of the longitudinal axis.

BACKGROUND

Telescopic steering shafts in motor vehicles make it possible to adjust the steering column, it being possible for the steering wheel position to be set in the longitudinal direction of the steering shaft. Moreover, the steering shaft can be pushed together in the case of a crash, which effectively prevents the steering column penetrating further into the interior of the passenger compartment and leading to injuries of the occupants. This is achieved as a rule by way of the provision of two shafts which can telescope with respect to one another, namely an outer shaft which is configured as a hollow shaft in the form of a tubular hollow profile, and an inner shaft which is mounted therein such that it can be displaced in the direction of the longitudinal axis of the steering shaft. The inner shaft and the hollow shaft together form a steering shaft which, by way of a telescoping relative movement of the shafts, can be shortened correspondingly by being pushed together or can be extended by being pulled out. The transmission of the torque which is introduced for steering purposes takes place via positively locking elements which engage into one another in a torque-transmitting manner, that is to say in a positively locking manner with regard to a rotation about the longitudinal axis, for example by way of a polygonal profile of the telescoping shafts or else positively locking elements which are inserted between the shafts, such as rolling bodies or the like.

A telescoping steering shaft is supplied and installed in the vehicle as a completely assembled module, in which the inner shaft is mounted in the outer shaft, that is to say is pushed into its opening cross section. In addition to normal operation, in which a steering column is adjusted in a controlled manner within the provided adjustment travel in order to set the steering wheel position, a steering shaft can be pulled apart in an uncontrolled manner in the direction of the longitudinal axis of the steering shaft, that is to say in the longitudinal direction, in the case of a repair of the vehicle, in the case of improper handling or in the case of transport, the inner shaft being pulled completely out of the hollow shaft and being separated from the outer shaft as a result. In the case of a safety-relevant component such as a steering column, unintentional dismantling of this type which leads to separation of the steering train has to be prevented reliably in any event. To this end, it is known to provide a securing apparatus in the form of a pulling-out limiting apparatus which limits the adjustment travel of the telescoping means and rules out a separation of the inner and outer shaft. In specific terms, to this end, a stop element is arranged in the opening cross section of the hollow shaft, which stop element comprises a stop face, the surface normal of which points in the longitudinal direction toward the hollow shaft, that is to say in the pushing-in direction of the inner shaft, as viewed from the inner shaft. The inner shaft can comprise a counterstop at its end, with a stop face which is directed counter to the stop element; in other words, its stop face engages behind the stop element with regard to the pulling-out direction.

In the prior art, CN201494492U has disclosed a securing apparatus, namely a pulling-out limiting apparatus, which is configured as a cap which is plugged onto that end of the outer hollow shaft which is directed toward the inner shaft and is fixed with regard to the longitudinal direction by way of positively locking engagement into a fastening groove which is configured in the outer side of the hollow shaft. The cap has a passage for the inner shaft, which passage is smaller than the opening cross section of the hollow shaft. As a result, a stop element with a stop face is provided by the cap in that opening of the hollow shaft which is covered partially by it, with which stop face, when the inner shaft is pulled out, a counterstop which is connected to or interacts with the inner shaft comes into contact and limits the pulling-out action, for example a head or projection which is arranged at the end of the inner shaft and is of greater cross-section than the passage of the cap, or else a positively locking element which is arranged between the inner and the outer shaft, such as a rolling body arrangement. Said cap has a relatively complicated multiple-piece construction and, on account of the fastening on the outer surface, projects to the outside beyond the outer cross section of the hollow shaft, which is disadvantageous during assembly, or requires complicated machining of the outer shaft.

DE 10 2009 000 432 A1 describes a securing apparatus of similar configuration. In said document, a holding cap is likewise proposed as pulling-out limiting apparatus, which holding cap is fixed in positively locking elements on the outer side of the outer shaft (hollow shaft). Said holding cap is also of multiple-piece configuration and engages around the hollow shaft from the outside. This requires corresponding machining, and the holding cap projects to the outside beyond the cross section of the outer shaft, which complicates the handling during assembly.

A disadvantage of the securing apparatuses which are known in the prior art is the complicated production and the unfavorable assembly capability.

In view of the problems explained in the preceding text, it is an object of the present invention to specify an improved steering shaft which comprises a securing apparatus for securing against pulling out, which securing apparatus is simple and can be assembled easily.

SUMMARY

In order to solve the abovementioned problem, it is proposed according to the invention that the stop element comprises at least one connector means which can be fixed from the inside in the opening cross section on the inner circumferential surface of the outer hollow shaft.

One special feature of the invention is that the stop element can be fastened from the inside, that is to say to the inner circumferential face of the outer hollow shaft. The fastening takes place by way of a connector means which can be attached in the opening from the inside on the hollow shaft, with the result that the stop element is fixed reliably in the hollow shaft in the direction of the longitudinal axis. The one or more connector means can be configured, for example, on a section of the securing apparatus, which section extends in a pin-like manner in the direction of the longitudinal axis of the steering shaft and the cross section of which is designed in such a way that it can be plugged into the open end of the outer hollow shaft, preferably in a positively locking manner into the opening profile.

It is a substantial advantage of the invention that the stop element is accommodated in a protected manner within the outer hollow shaft. In particular, there is no cap or the like which projects beyond the outer cross section of the hollow shaft as in the prior art, with the result that the handling of a steering column is improved during assembly. By way of the fastening in the interior of the hollow shaft, the stop element is secured in an improved manner against unintentional dismantling, as a result of which the reliability of the securing apparatus is increased.

The securing apparatus according to the invention can be produced with low complexity. The stop element can be configured as a type of plug with a coupling section, the outer contour of which corresponds with the inner contour of the outer hollow shaft. For assembly, the coupling section is simply plugged into the opening of the hollow shaft in the longitudinal direction of the steering shaft and is fixed.

It is particularly advantageous that the connector means comprises at least one fastening element which can be introduced from the inside in a positively locking manner into a recess which is configured in an inner circumferential surface of the outer hollow shaft. A fastening element of this type can be arranged on the outer circumferential surface of the stop element, where it is directed against the inner circumferential surface of the hollow shaft. In this region, the inner circumferential surface can comprise a recess in the form of a depression, groove, opening or undercut with regard to the longitudinal direction, into which the fastening element which projects beyond the inner opening cross section of the hollow shaft engages in a positively locking manner. Secure fixing of the stop element within the hollow shaft is achieved by way of the positively locking connection in the direction of the longitudinal axis of the steering shaft. Here, the configuration of the hollow shaft with a recess in its end region can be brought about simply in terms of production technology. By virtue of the fact that the at least one fastening element is situated within the hollow shaft in the assembled state, said fastening element is protected in a particularly satisfactory manner against unintentional release, as a result of which the reliability of the securing apparatus is increased.

One advantageous embodiment provides that the fastening element comprises a latching lug. A latching lug is formed by way of a positively locking element which is attached on the stop element in a sprung manner and corresponds with a recess in the inner circumferential surface of the hollow shaft. In the relieved state, the positively locking element projects to the outside beyond the inner opening cross section of the hollow shaft. It can be moved to the inside counter to the spring force, with the result that it no longer projects beyond the opening cross section and the stop element can be introduced into the opening of the hollow shaft. When the recess is reached, said positively locking element latches into said recess in a positively locking manner by way of the spring force, and locks the stop element within the opening of the hollow shaft. A latching lug is particularly preferably configured in the manner of a barb, with an insertion bevel which rises to the outside counter to the insertion direction with regard to the opening cross section and is adjoined by a locking face which slopes down perpendicularly with regard to the longitudinal axis and ensures a locking action in the recess. In the case of a configuration of this type of the latching lug, the assembly can be carried out simply by virtue of the fact that the stop element is plugged into the opening of the outer hollow shaft, the latching lug being automatically stressed elastically by way of the insertion bevel and snapping into the recess when the holding position is reached.

For simple production, it is advantageous that a latching lug is configured in one piece with the stop element. Here, the sprung configuration can be brought about by way of an elastically bendable tongue which is made from the material of the stop element and at the free end of which a positively locking element is integrally formed. A single-piece fabrication of this type can be realized, for example, using plastic injection molding, and in some circumstances also as a metallic formed part or sintered part.

One alternative embodiment provides that the fastening element comprises a bolt element which can be inserted into a recess in the connector element in a positively locking manner with regard to the direction of the longitudinal axis. In this embodiment, a recess which corresponds with the recess in the inner circumferential surface of the outer hollow shaft is configured in the connector element. Said recess serves to receive a bolt element in a positively locking manner, which bolt element likewise engages in a positively locking manner into the corresponding recess in the hollow shaft and therefore ensures positively locking fixing of the stop element and therefore of the securing apparatus in the hollow shaft in the direction of the longitudinal axis of the steering shaft.

The practical realization can be carried out simply by virtue of the fact that the recess on the stop element is configured as a groove which runs at least partially around the outside of the connector element, and the recess in the opening of the hollow shaft is configured as a groove which runs around on the inside and lies opposite the groove on the stop element. The bolt element can be configured as a radially slotted spring ring or Seeger ring which, in the radially compressed, stressed state, can be introduced into the opening of the hollow shaft so as to be seated lightly on the connector element and, in the relieved state, dips into the two grooves which lie opposite one another, with the result that the grooves are fixed in a positively locking manner with regard to a relative movement in the direction of the longitudinal axis of the steering shaft. The particularly simple possible shape of the stop element and the use of inexpensive standard spring rings are advantageous in this embodiment. It is advantageous, furthermore, that the positively locking fixing takes place independently of the elasticity of the material of the preferably integral main body of the stop element, which main body can additionally comprise a basic form which is simpler and easier to produce without integrated elastic elements. The safety benefits from the fact that it is practically impossible for a stop element which is secured by way of a bolt element to be dismantled without destruction, with the result that damage can be detected easily.

One particularly preferred embodiment of the invention provides that the connector means comprises at least one connector element which can be inserted in a torque-transmitting manner into the opening cross section of the outer hollow shaft, and the stop element comprises a through opening, in which the inner shaft can be attached in a torque-transmitting manner with regard to rotation about the longitudinal axis of the steering shaft. By way of this configuration, in addition to the function as a pulling-out limiting apparatus, the securing apparatus according to the invention is given a further substantial safety function, namely a redundant torque coupling between the inner shaft and the outer hollow shaft. This is achieved by virtue of the fact that firstly the inner shaft is connected to the stop element in a positively locking manner, with regard to a rotation, that is to say in a torque-transmitting manner, about the longitudinal axis of the steering shaft, which stop element itself in turn is connected to the outer hollow shaft in a positively locking manner with regard to a rotation, that is to say in a torque-transmitting manner, about the longitudinal axis of the steering shaft. As a result, the stop element brings about a torque-proof connection of the inner shaft to the outer hollow shaft; it effectively acts as a rigid coupling. As a result, a replacement coupling is provided for the case where the positively locking elements which are used primarily in the steering shaft for transmitting the steering torque fail, for example in the case of a fracture of rolling bodies in steering shafts which are mounted in linear anti-friction bearings. In this way, the safety standard of a steering column is advantageously increased without additional complexity by way of a stop element according to the invention.

The torque-transmitting connection can be realized by virtue of the fact that both the opening of the hollow shaft and the stop element which is introduced therein comprise a corresponding profile cross section which is continuous in the direction of the longitudinal axis, for example a rectangular (preferably square), triangular, hexagonal or octagonal polygon basic shape. Accordingly, the through opening in the stop element is adapted to the profile cross section of the inner shaft which can likewise be configured, for example, as a polygon. The basic shape of the profile cross section preferably coincides in the case of the inner and the outer shaft, but this is not absolutely necessary. As an alternative to a polygonal profile, longitudinal spline systems or the like which can be pushed into one another can also be provided as torque-transmitting elements.

A stop element which serves primarily according to the invention as a pulling-out limiting apparatus can be configured as a molded plastic part, for example as a single-piece injection molded part. A high safety standard is already achieved by way of the use of suitable plastic materials and the protected arrangement and fixing according to the invention. If the additional function as a replacement coupling for the redundant transmission of the steering torque is to be optimized, in addition to high strength filled plastics, metallic materials can be used for the stop element, for example as metallic cast, formed or sintered parts. In order to achieve particularly adapted properties, different metal and plastic materials can be combined with one another, for example for satisfactory sliding properties with high strengths.

A seal element which runs around along the inner contour of the through opening is preferably arranged in said through opening. The seal lies on the outer circumferential face of the inner shaft which is mounted displaceably in the through opening, and protects the steering shaft against the penetration of contaminants, foreign bodies and moisture.

In one advantageous development, the stop element comprises a covering element which goes beyond the opening cross section of the outer hollow shaft and comprises an axial supporting face which can be supported against an axial end side of the outer hollow shaft. The covering element forms a type of head of the stop element according to the invention, which head cannot be introduced into the opening of the hollow shaft, but rather lies axially on the end-side axial face at the end of the hollow shaft by way of a preferably circumferential supporting face. The covering element can serve as a pushing-in limiting means for the stop element according to the invention and as a soft axial stop which comes into contact with the fork at the free end of the inner shaft when the steering shaft is pushed in completely.

The connector means and the covering element can be configured in one piece, for example as an injection molded part made from plastic.

One advantageous embodiment of the invention provides that at least one rolling body is arranged between the inner shaft and the outer shaft, which rolling body can roll on the outer circumferential face of the inner shaft and the inner circumferential face of the outer shaft. As a result, a steering shaft is realized which is mounted by way of linear anti-friction bearings with regard to its adjustment movement in the longitudinal direction. Here, the rolling bodies serve as positively locking elements for transmitting the torque between the inner and the outer shaft. In the case of a relative movement of the shafts, the rolling body likewise moves in the longitudinal direction and can come into contact with the stop element according to the invention in order to limit the pulling-out action. If the at least one rolling body is held in a rolling body cage, the latter can comprise a counter-surface which can be moved against the stop element. This is the axial stop face which is configured on the connector element.

DESCRIPTION OF THE DRAWINGS

Advantageous embodiments of the invention will be described in greater detail in the following text using the drawings, in which, in detail.

DETAILED DESCRIPTION

In the various figures, identical parts are always provided with the same designations and are therefore also as a rule named or mentioned in each case only once.

Figure 1:
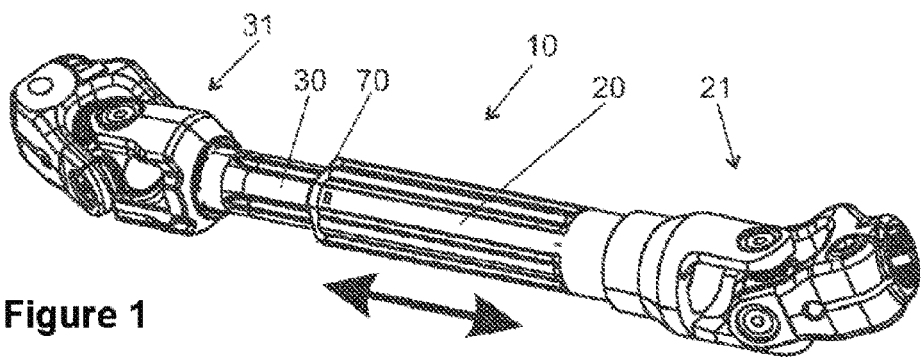
FIG. 1 shows a diagrammatic perspective view of a steering shaft.

FIG. 1 shows a perspective view of a diagrammatically shown steering shaft 10 which comprises an outer hollow shaft 20 and an inner hollow shaft 30 which can telescope with respect to one another in the direction of the longitudinal axis, that is to say in the longitudinal direction which is indicated by way of the double arrow.

At its free end which faces away in the longitudinal direction with regard to the inner shaft 30, the outer hollow shaft 20 comprises a fork 21 which forms a part of a universal joint, by way of which the steering shaft 10 is connected in a torque-transmitting manner to the steering train. Accordingly, at its free end which faces away in the longitudinal direction with regard to the outer shaft 20, the inner hollow shaft 30 comprises a fork 31 which forms a part of a further universal joint, by way of which the steering shaft 10 is connected in a torque-transmitting manner to the steering train. The hollow shafts 20 and 30 are preferably produced from steel which can be satisfactorily cold worked.

A stop element 70 according to the invention is inserted into the opening of the outer hollow shaft 20 in the direction of the longitudinal axis of the steering shaft 10. The inner shaft 30 is guided displaceably through the stop element 70.

Figure 2:
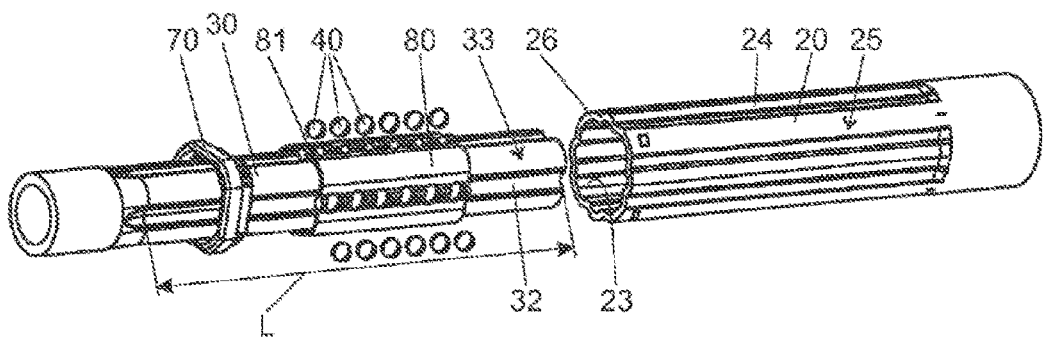
FIG. 2 shows a part of a steering shaft according to FIG. 1 in the dismantled state.

FIG. 2 shows a part of the steering shaft 1 according to FIG. 1 in an exploded illustration, in which the individual constituent parts are shown in the dismantled state. It is apparent from this that the outer hollow shaft 20 is profiled in its region which faces the inner shaft 30 and into which the inner shaft 30 can be pushed in a telescoping manner in the longitudinal direction. The profiling of the outer shaft 20 comprises grooves 22 which extend in the longitudinal direction in the inner circumferential surface 23 of the outer shaft 20. Convexly projecting bead-like shaped-out formations 24 are configured in the outer circumferential surface 25 so as to lie opposite the grooves 22 on the outside with regard to the wall of the hollow shaft 20. In the embodiment which is shown, both the inner shaft 30 and the outer hollow shaft 20 are configured as hollow profiles with a substantially square cross-sectional basic shape. Here, a total of four grooves 22 are arranged distributed uniformly over the circumference of the hollow shaft 20, namely in each case in the center of one of the sides of said square cross section. The grooves 22 are configured as rolling body raceways, or more specifically as ball raceways.

That end section of the inner hollow shaft 30 which faces the outer hollow shaft 20 and can be pushed into the latter in a telescoping manner, as shown in FIG. 1, is likewise profiled. The profiling comprises grooves 32 which extend in the longitudinal direction over a length L in the outer circumferential surface 33 of the hollow shaft 30 from the end which can be plugged into the outer hollow shaft 20. The length L extends over that part section of the inner hollow shaft 30 which can be plugged into the outer hollow shaft 20 in the longitudinal direction.

Figure 3:
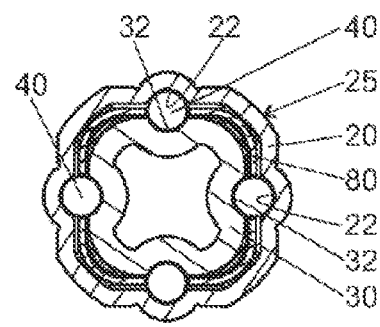
FIG. 3 shows a cross-sectional view of a steering shaft according to the preceding figures.

In combination with the cross-sectional illustration in FIG. 3, it can be seen clearly from FIG. 2 how rolling bodies, namely balls 40, are arranged radially between the grooves 22 and 32. A plurality of balls 40 are arranged in each case in the longitudinal direction behind one another in the grooves 22 and 32. Here, they are held in a sleeve 80 which is configured as a rolling body cage or ball cage 80, such that they can be rotated freely and are at a defined spacing relative to one another. At the same time, the sleeve 80 ensures that adjacent balls 40 in the circumferential direction remain in each case in the same position with regard to the longitudinal direction.

The embodiment which is shown in FIG. 3 shows a rectangular (specifically, a square) basic cross section of the hollow shafts 20 and 30. The grooves 22 and 32 are arranged symmetrically in each case centrally in one side of the square.

Figure 10:
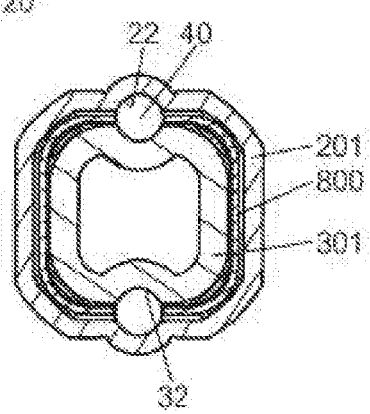
FIG. 10 shows a cross-sectional view of a steering shaft as in FIG. 3 in a second embodiment.

A similar, further embodiment as in the illustration of FIG. 3 is shown in FIG. 10. In contrast to the first embodiment, this comprises only a total of two rows of balls 40 which roll between an outer hollow shaft 201 and an inner hollow shaft 301 in grooves 22 and 32 which are situated symmetrically on two opposite sides of the square. The balls 40 are guided in an adapted sleeve 800. In said embodiment, all embodiments for the stop element 70 or 700 can be used.

Figure 4:
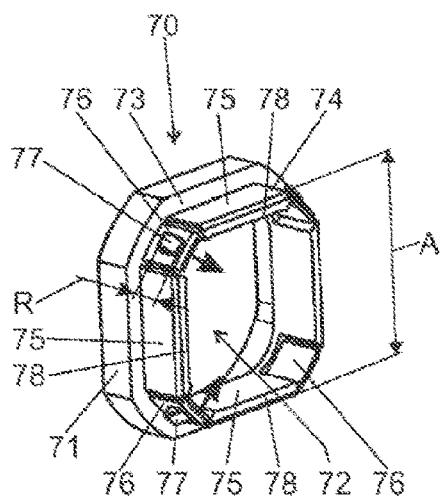
FIG. 4 shows a perspective view of a stop element according to the invention in a first embodiment.
Figure 5:
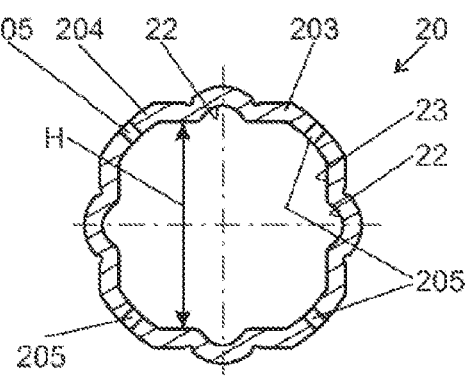
FIG. 5 shows a cross section through the outer hollow shaft according to FIG. 1.

FIG. 4 shows a stop element 70 according to the invention in a perspective view, to be precise as viewed obliquely from the direction of the hollow shaft 20. The basic shape of the stop element 70 is square in accordance with the cross section of the hollow shaft 20, as shown in FIG. 5.

The stop element 70 comprises a frame-shaped covering element 71, with a through opening 72 and an axial supporting face 73. A connector element 74 with a total of four connector means 75 which lie opposite one another in each case in pairs parallel to the sides 203 of the square cross section extends from the supporting face 73 in the direction of the longitudinal axis (to the bottom right toward the observer in the view which is shown). In one example, the connector means 75 and the covering element 71 can be configured in one piece. Tongue-like fastening means 76 with latching lugs 77 are arranged between the connector means 75 in the corner regions of the square. The latching lugs 77 are at a spacing R from the axial supporting face 73 in the direction of the longitudinal axis. The fastening elements 76 are of elastically sprung configuration, with the result that the latching lugs 77 which are arranged thereon can deflect inward into the cross section of the through opening 72, which is indicated by way of the small arrow.

Stop faces 78 are configured on the connector means 75 on their end sides which face the observer.

The spacing A of the outer sides of the connector means 75 is slightly smaller than the inner spacing H between the sides 203 of the hollow shaft 20 which lie opposite one another. The same applies to the outer spacing of the fastening elements 76 which is slightly smaller than the inner spacing between the corner regions 204 of the hollow shaft 20. It is possible as a result to introduce the stop element 70 with the connector element 74 into the opening of the hollow shaft 20 in the direction of the longitudinal axis of the steering shaft 10.

By virtue of the fact that the latching lugs 77 project beyond the opening cross section of the hollow shaft 20 in the relieved state which is shown, they are first of all pressed inward in a sprung manner during the introduction. Recesses 205 are made in the inner circumferential face 23 of the hollow shaft 20 in the corner regions 204 at a spacing R from the end side 26. Said recesses 205 can particularly preferably be configured as punched-out apertures, or else also as groove-like depressions, the shape and dimensions of which correspond to those of said latching lugs 77. As soon as the latching lugs 77 reach the recesses during the introduction, they are moved outward by way of the spring force which acts, and snap into the recesses 205 in a positively locking manner. In this inserted state, the covering element 70 lies with its supporting face 73 on the end side 26 of the hollow shaft 20.

Figure 6:
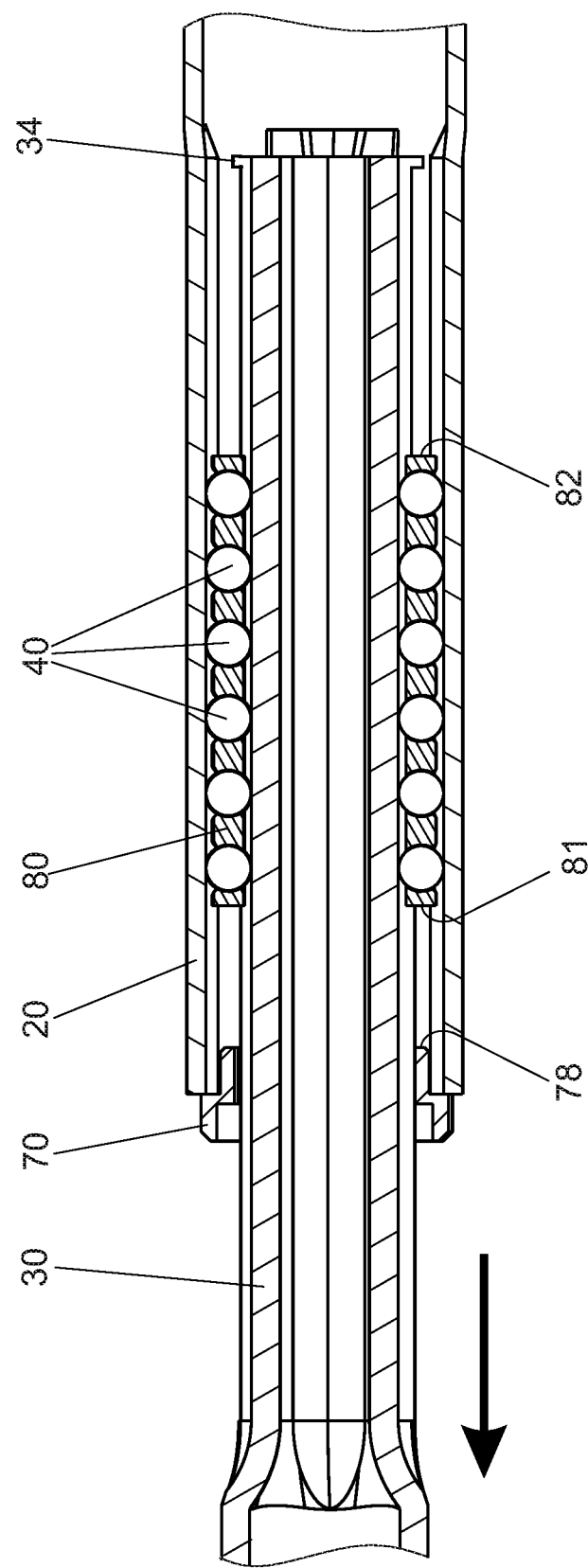
FIG. 6 shows a longitudinal section along the longitudinal axis of the steering shaft according to FIG. 1.

As can be gathered from FIG. 1 and the sectional illustration of FIG. 6, the covering element 70 does not project outward beyond the outer cross section of the hollow shaft 20.

The circumferential cross section of the connector element 74 which is delimited substantially by way of the connector means 75 and the fastening elements 76 engages into the opening cross section of the hollow shaft 20 in a positively locking manner, or in other words in a torque-transmitting manner, with regard to a rotation about the longitudinal axis during the insertion. By virtue of the fact that the outer cross section of the inner shaft 30 likewise engages into the through opening 72 of the connector element 74 in a positively locking manner, or in other words in a torque-transmitting manner, with regard to a rotation about the longitudinal axis during the assembly of the steering shaft 10, the connector element 74 brings about a rotationally rigid coupling between the inner shaft 30 and the outer hollow shaft 20.

It can be seen clearly in the sectional illustration of FIG. 6 how the rolling body cage 80 comes into contact by way of a stop face 81 with the stop face 78 on the stop element 70 during the pulling-out action of the inner shaft 30 out of the hollow shaft 20 in the arrow direction, and limits the pulling-out action effectively. It is likewise conceivable to attach a stop 34 at that end of the inner shaft 30 which dips into the hollow shaft 20, which stop 34 projects beyond the cross-sectional profile of the inner shaft 30 and comes into contact with a further stop face 82 on the rolling body cage 80 during the pulling-out operation.

Figure 7:
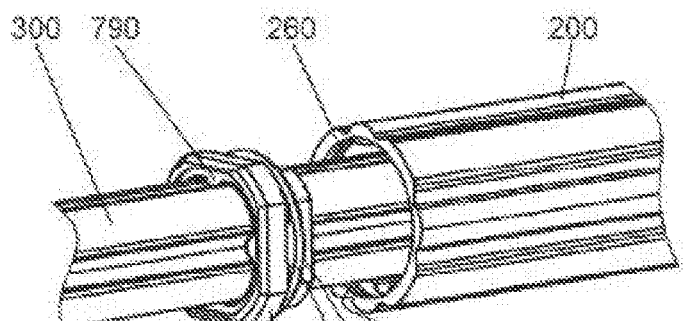
FIG. 7 shows a perspective detailed view of a steering shaft in a second embodiment.
Figure 8:
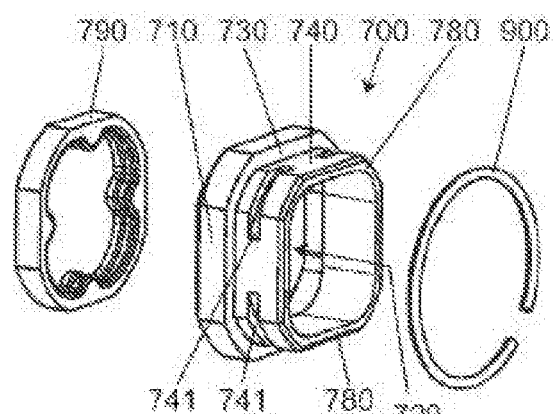
FIG. 8 shows a perspective view of a stop element according to the invention in a second embodiment in the dismantled state.
Figure 9:
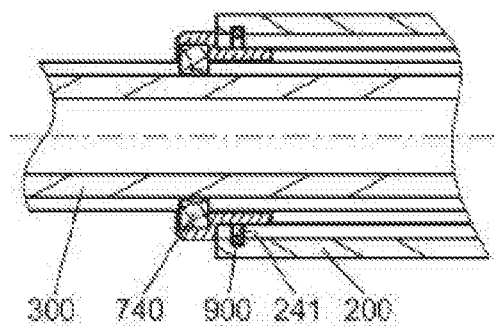
FIG. 9 shows a partial longitudinal section along the longitudinal axis of the steering shaft according to FIG. 7 in the assembled state.

A second embodiment of a stop element 700 according to the invention is shown in FIGS. 7, 8 and 9. It comprises a covering element 710 (head) which is adjoined by a connector element 740 which comprises the shape of a polygonal tubular stub with a through opening 720. The latter is designed with regard to shape and dimensions in such a way that it can be inserted into the opening cross section of a hollow shaft 200 in a positively locking manner, or in other words in a torque-transmitting manner, with regard to a rotation about the longitudinal axis.

A groove 741 which runs around at least in sections is made in the connector element 740, which groove 741 is at a spacing from the axial supporting face 730. A groove 241 is made at the same spacing in the inner circumferential surface of the hollow shaft 200. In the inserted state when the stop element 700 lies with the supporting face 730 against the end side 260 of the hollow shaft 200, the grooves 241 and 741 lie radially opposite one another with their groove openings.

A slotted spring ring 900 can be inserted into the groove 741, and can be reduced in circumference by way of radial compression to such an extent that the connector element 740 including the stressed spring ring 900 can be introduced into the opening of the hollow shaft 200. When the groove 741 comes into congruence with the groove 241 during the further introduction, the spring ring 900 is relieved in the radial direction and at the same time engages into the grooves 241 and 741 in a positively locking manner. As a result, the stop element 700 is locked in the hollow shaft 200 in a positively locking manner against being pulled out. In this way, the stop face 780 is securely fixed axially in the direction of the longitudinal axis.

The connection of the inner shaft 300 to the outer shaft 200 by way of the stop element 700, which connection is positively locking, or in other words torque-transmitting, with regard to a rotation about the longitudinal axis, takes place in an analogous manner to the explanation which is given above with respect to the stop element 70.

A seal element 790 can be attached on the stop element 700 or 70 for sealing the steering shaft 10 against the penetration of foreign bodies and moisture. Said seal element 790 can be inserted from outside into the stop element 700, as shown in FIG. 9. Said seal element 790 engages with its inner side around the inner shaft 300 on the cross-sectional contour in a sealing manner.

| List of Designations | |
|---|---|
| 10 | Steering shaft |
| 20, 200 | Outer hollow shaft |
| 201 | Outer hollow shaft |
| 21 | Fork |
| 22 | Groove |
| 23 | Inner circumferential surface |
| 24 | Shaped-out formations |
| 241 | Groove |
| 25 | Outer circumferential surface |
| 203 | Side of the square cross section |
| 204 | Corner region |
| 205 | Recess |
| 26, 260 | End side |
| 30, 300 | Inner hollow shaft |
| 301 | Inner hollow shaft |
| 31 | Fork |
| 32 | Groove |
| 33 | Outer circumferential surface |
| 34 | Stop |
| 40 | Ball |
| 70, 700 | Stop element |
| 71, 710 | Covering element |
| 72, 720 | Through opening |
| 73, 730 | Supporting face |
| 74, 740 | Connector element |
| 741 | Groove |
| 75 | Connector means |
| 76 | Fastening element |
| 77 | Latching lugs |
| 78, 780 | Stop face |
| 80, 800 | Rolling body cage (sleeve) |
| 81, 82 | Stop face |
| 900 | Spring ring |
| R | Spacing 73-77 |
| A | Spacing |
| H | Inner spacing |

The invention claimed is:

1. A steering shaft for a motor vehicle, the steering shaft comprising:
    an outer shaft which is configured as a hollow shaft, the outer shaft having an inner circumferential face on an opening cross-section that defines at least one outer shaft recess;
    an inner shaft which is arranged coaxially in the hollow shaft, wherein the inner shaft is configured to be telescoped relative to the hollow shaft in the direction of a longitudinal axis of the steering shaft, and is connected to the hollow shaft in a torque-transmitting manner via at least one positively locking element;
    a securing apparatus with at least one stop element which is attached on that end region of the hollow shaft which faces the inner shaft, and has a stop face which is arranged in the opening cross section of the hollow shaft and faces the hollow shaft in the direction of the longitudinal axis; and
    wherein the stop element comprises at least one connector means which can be fixed from an inside of the opening cross section on the inner circumferential surface of the outer hollow shaft wherein the at least one connector means comprises at least one fastening element that is selectively introduced into the outer shaft whereby the fastening element moves relative to the stop face in a direction outwardly into an outer shaft recess of the at least one outer shaft recess in a positively locking manner.

2. The steering shaft as claimed in claim 1, wherein the fastening element comprises an elastically sprung latching lug.

3. The steering shaft as claimed in claim 1, wherein the fastening element comprises a bolt element which can be inserted into an outer shaft recess of the at least one outer shaft recess in the connector element in a positively locking manner with regard to the direction of the longitudinal axis.

4. The steering shaft of claim 3 wherein the bolt element comprises a slotted spring ring.

5. The steering shaft of claim 4 wherein the stop element further defines a stop element recess, wherein the slotted ring concurrently locates into the outer shaft recess and the stop element recess in an inserted state.

6. The steering shaft as claimed in claim 1 wherein the connector means comprises at least one connector element which can be inserted in a torque-transmitting manner into the opening cross section of the outer hollow shaft, and the stop element comprises a through opening, in which the inner shaft can be attached in a torque-transmitting manner with regard to rotation about the longitudinal axis of the steering shaft.

7. The steering shaft as claimed in claim 6, further comprising:
    a seal element which runs around along the inner contour of the through opening is arranged in said through opening.

8. The steering shaft of claim 1 wherein the stop element comprises a covering element which goes beyond the opening cross section of the outer hollow shaft and comprises an axial supporting face which can be supported against an axial end side of the outer hollow shaft.

9. The steering shaft as claimed in claim 8, wherein the connector means and the covering element are configured in one piece.

10. The steering shaft of claim 1 wherein the at least one positively locking element comprises at least one rolling body arranged between the inner shaft and the outer shaft which rolling body can roll on the outer circumferential surface of the inner shaft and the inner circumferential surface of the outer shaft.

11. The steering shaft of claim 1 wherein the at least one fastening element is fixed exclusively from the inside into the at least one shaft recess in the opening cross section.

* * * * *